(12) United States Patent
Yan et al.

(10) Patent No.: US 6,502,105 B1
(45) Date of Patent: Dec. 31, 2002

(54) REGION-BASED IMAGE ARCHIVING AND RETRIEVING SYSTEM

(75) Inventors: Yong Yan, Yorktown Heights, NY (US); Cedric Y. Caron, Croton-On-Hudson, NY (US); Kiran Challapali, Stamford, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/232,896

(22) Filed: Jan. 15, 1999

(51) Int. Cl.$^7$ .......................... G06F 17/00; G06F 15/00; G06T 11/20

(52) U.S. Cl. ................ 707/104.1; 707/526; 345/440

(58) Field of Search .................. 707/1–104, 200–205, 707/500, 526, 515; 345/348, 326–355, 621, 625, 440; 382/180

(56) References Cited

U.S. PATENT DOCUMENTS

| | | | | |
|---|---|---|---|---|
| 5,544,267 A | * | 8/1996 | Mahoney et al. | 382/317 |
| 5,751,286 A | * | 5/1998 | Barber et al. | 345/348 |
| 5,751,852 A | * | 5/1998 | Marimont et al. | 382/180 |
| 5,893,095 A | * | 4/1999 | Jain et al. | 707/6 |
| 5,974,201 A | * | 10/1999 | Chang et al. | 382/305 |
| 6,121,969 A | * | 9/2000 | Jain et al. | 345/355 |
| 6,240,424 B1 | * | 5/2001 | Hirata | 707/104 |

OTHER PUBLICATIONS

PHA 23,390—U.S. patent application Ser. No. 09/062,940, filed Apr. 20, 1999.
Park et al., "Models and Algorithms for Efficient Color Image Indexing", Proceedings, IEEE Workshop on Content–Based Access of Image and Video Libraries, Cat. No. 97TB100175, Jun. 20, 1997, pp. 36–41, XP002143808.
Doulamis et al., "A Pyramid Graph Representation for Efficient Image Content Description", 1999 IEEE Third Workshop on Multimedia Signal Processing, Cat. No. $99^{TH}8451$, Sep. 1999, pp. 109–114, XP002143809.

* cited by examiner

Primary Examiner—Alford W. Kindred
(74) Attorney, Agent, or Firm—Gregory L. Thorne

(57) ABSTRACT

The system disclosed herein builds a database of image-related data by inputting a plurality of images, and for each image: dividing the image into $N_1$ ($N_1 \geq 1$) regions which are substantially homogenous with respect to at least one attribute of the image, generating a graph based on $M_1$ ($M_1 \geq 1$) of the $N_1$ regions, and storing data for the graph in the database. The database may then be used to determine whether a query image is similar to one or more of the plurality of images. To this end, the system inputs the query image, and divides the query image into $N_2$ ($N_2 \geq 1$) regions which are substantially homogenous with respect to at least one attribute of the query image. The system then generates a graph based on $M_2$ ($M_2 \geq 1$) of the $N_2$ regions, and compares the generated graph to other graphs in the database that correspond to the plurality of images. Thereafter, an image is retrieved from memory that has a graph that is substantially similar to the generated graph.

38 Claims, 6 Drawing Sheets

REGION-BASED IMAGE ARCHIVING AND RETRIEVING SYSTEM

BACKGROUND OF THE INVENTION

1. Field of the Invention

The present invention is directed to a system which builds a database of image graphs, and which retrieves images that are similar to a "query" image using this database. Specifically, the invention generates graphs of images based on homogeneous regions thereof, and stores these graphs in the database, together with pointers to the images. The invention then generates a similar graph for the query image, and compares the query image graph to the graphs in the database. Those graphs in the database that are similar to the query image graph are identified, and their corresponding images retrieved.

2. Description of the Related Art

In recent years, it has become commonplace for personal computers and other digital hardware to process and display digital images. This is due, in no small part, to the increase in popularity of digital video on the Internet. As a result of this increased use of digital imagery, it has become necessary to retrieve images from increasingly larger image databases. This typically does not present a problem if there is some way to readily identify the images, such as via a file name or the like.

On the other hand, it is more difficult to retrieve images from a large database if the only way to retrieve the images is based on their content, as is oftentimes the case, e.g., for digital video and for scanned images. For example, a user may wish to locate a video clip based on a single frame of video, or to locate particular frame of video within a video clip. Similarly, a user may wish to determine which of a plurality of pre-stored images best matches a scanned image. In these cases, image retrieval can be difficult.

Current methods of retrieving images, such as frames of video, from a database involve labeling the individual frames, and then searching through the frames manually for particular frames based on these labels. As might be expected, this process is both time consuming and inefficient. Automated content-based image retrieval systems exist. However, these systems are often slow due to the amount of processing required, and often produce erroneous results, particularly for images having different orientations, rotations, scaling, translations, and aspect ratio variations.

Accordingly, there exists a need for an automated content-based image retrieval system that addresses these and other drawbacks of conventional systems. In particular, there exists a need for a system which provides for content-based image retrieval that is both accurate and fast.

SUMMARY OF THE INVENTION

The present invention addresses the foregoing needs by providing a method of building a database from which images, such as frames of video, can be retrieved based on their content. In more detail, the invention inputs images, divides the images into one or more regions based on one or more attributes of the image, such as color, texture, etc., and generates a graph of the regions. This graph is then stored in the database, together with a pointer to the image. This database can then be used to retrieve one or more images (e.g., frames of video) that are similar to an input, or "query" image.

To this end, the invention performs substantially the same processing on the query image as that performed to generate the graphs in the database. That is, the invention divides the query image into regions based on one or more attributes of the image, and generates a graph based on the regions. Thereafter, the graph for the query image is compared to graphs in the database. Images are then retrieved whose graphs have at least a predetermined level of similarity to the "query image" graph. Alternatively, the system retrieves a fixed number of the most similar images, such as the ten images whose graphs are most similar to the query image graph.

By virtue of the foregoing, the present invention provides a way to retrieve images based on content that operates automatically, rather than manually. In other words, the invention eliminates the necessity of physically labeling images, such as frames of video, and then manually "flipping through" those images to locate an image that is similar to a query image. Moreover, because the invention compares image graphs, and particularly features thereof, the invention is able to determine whether two images are similar regardless of image orientation, rotation, scaling, translation, and aspect ratio variations.

Thus, according to one aspect, the present invention is a system (i.e., a method, an apparatus, and computer-executable process steps) for building a database of image-related data. The system inputs a plurality of images, such as key frames of a video sequence. For each input image, the system divides (or "segments") the image into $N_1$ ($N_1 \geq 1$) regions which are substantially homogenous with respect to one or more attributes of the image, and generates a graph based on $M_1$ ($M_1 \geq 1$) of the $N_1$ regions, where $M_1$ may, or may not, equal $N_1$. The system then stores data for the graph in the database.

According to another aspect, the invention is a system which uses graphs corresponding to a plurality of images to determine whether a query image is similar to one or more of the plurality of images. In operation, the system inputs the query image, divides the query image into $N_2$ ($N_2 \geq 1$) regions which are substantially homogenous with respect to one or more attributes of the query image, and generates a graph based on $M_2$ ($M_2 \geq 1$) of the $N_2$ regions, where one or more individual values of $N_1$, $N_2$, $M_1$ and $M_2$ may or may not be equal. The system then compares the generated graph to other graphs in a database that correspond to the plurality of images, and retrieves one or more images having graphs that substantially correspond to the graph of the query image.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Initially, it is noted that the present invention can be implemented by processors in many different types of image processing devices and video processing equipment. For the sake of brevity, however, the invention will be described only in the context of a personal computer ("PC").

Figure 1:
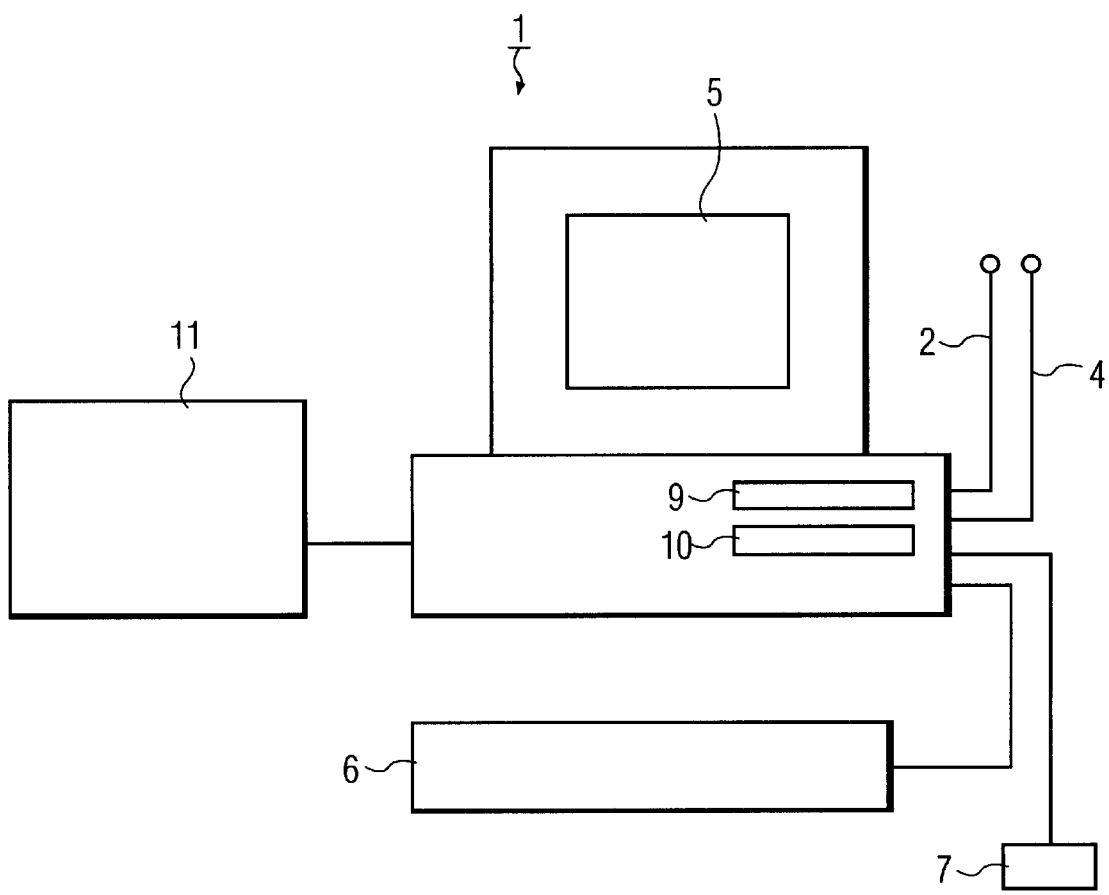
FIG. 1 shows computing equipment on which the present invention may be implemented.

FIG. 1 shows computing equipment for a PC on which the present invention is implemented. As shown, PC 1 includes network connection 2 for interfacing to a network and fax/modem connection 4 for interfacing with the network or other devices (not shown), particularly those capable of inputting image data. Examples of such devices include, but are not limited to, a digital camera, a digital video camera, and a scanner. PC 1 also includes display screen 5 for displaying information (including images/video) to a user, keyboard 6 for inputting text and user commands, mouse 7 for positioning a cursor on display screen 5 and for inputting user commands, disk drive 9 for reading from and writing to floppy disks installed therein, and DVD drive 10 for accessing data (e.g., video) stored on DVD. PC 1 may also have one or more local peripheral devices connected thereto, such as printer 11.

Figure 2:
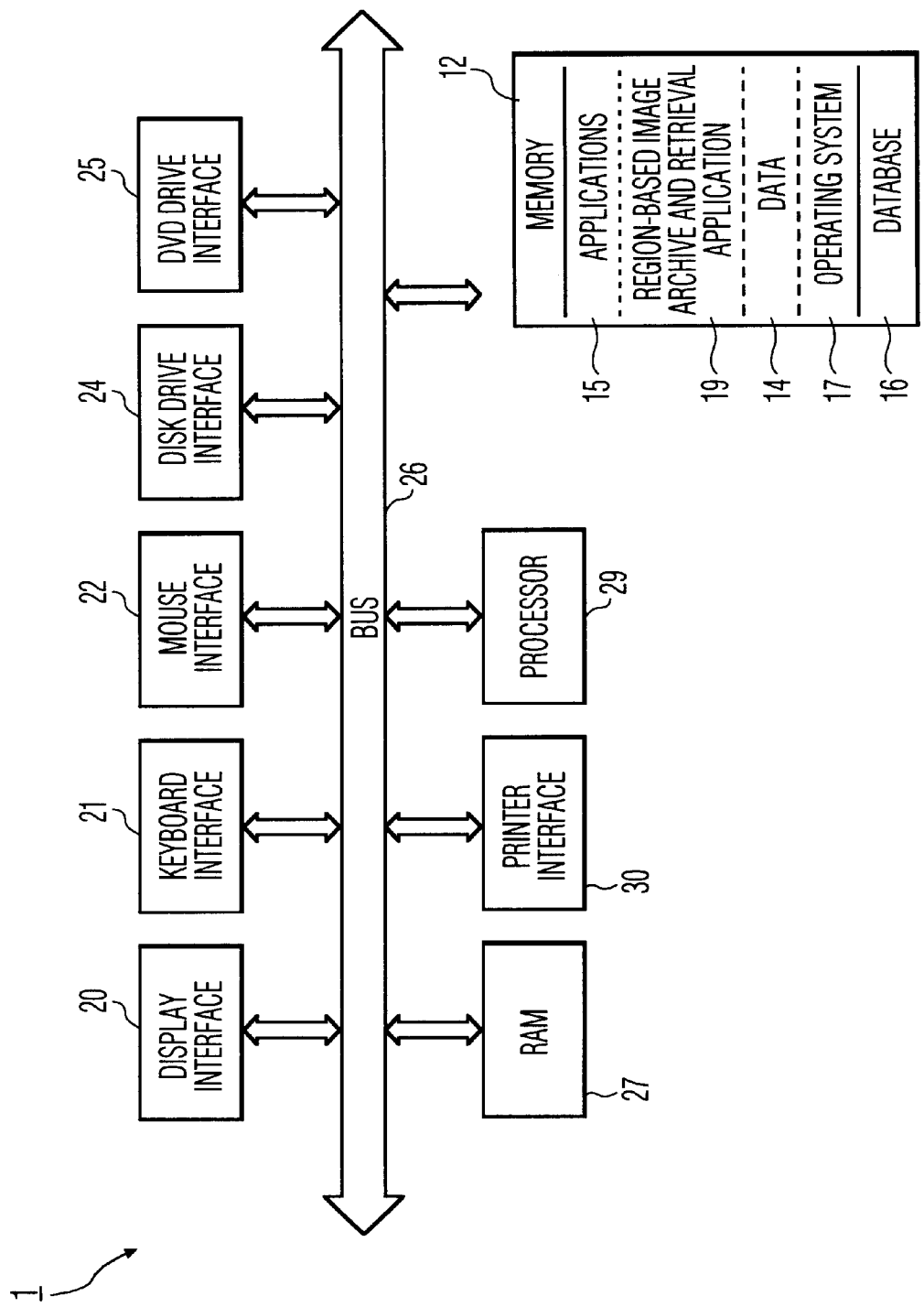
FIG. 2 shows the architecture of that computing equipment.

FIG. 2 shows the internal structure of PC 1. As shown in FIG. 2, PC 1 includes memory 12, which comprises a computer-readable medium such as a computer hard disk and/or RAID ("redundant array of inexpensive disks"). Memory 12 stores data 14, applications 15, database 16, and operating system 17. In preferred embodiments of the invention, operating system 17 is a windowing operating system, such as Microsoft® Windows98; although the invention may be used with other operating systems as well. Among the applications stored in memory 12 is region-based image archive and retrieval application 19, which stores image graphs and pointers in database 16 and which retrieves image pointers therefrom by the process described below.

PC 1 also includes display interface 20, keyboard interface 21, mouse interface 22, disk drive interface 24, DVD drive interface 25, computer bus 26, RAM 27, processor 29, and printer interface 30. Processor 29 preferably comprises a microprocessor or the like for executing applications, such those noted above, out of RAM 27. Such applications, including application 19, may be stored in memory 12 (as noted above) or, alternatively, on a floppy disk in disk drive 9. Processor 29 accesses applications (or other data) stored on a floppy disk via disk drive interface 24 and accesses applications (or other data) stored on a DVD via DVD drive interface 25.

Application execution and other tasks of PC 1 may be initiated using keyboard 6 or mouse 7, commands from which are transmitted to processor 29 via keyboard interface 21 and mouse interface 22, respectively. Output results from applications running on PC 1 may be processed by display interface 20 and then displayed to a user on display 5 or, alternatively, output to a network via network connection 2. To this end, display interface 20 preferably comprises a display processor for forming images based on image data provided by processor 29 over computer bus 26, and for outputting those images to display 5. As described in detail below, the data for these images may be retrieved via application 19.

In brief, application 19 comprises computer-executable code (i.e., process steps) which is used both to build a database 16 comprised of data relating to a plurality of images, and to retrieve images similar to an input, or "query", image using that database. To build database 16, application 19 inputs a plurality of images, and for each image, divides (or "segments") the image into $N_1$ ($N_1 \geq 1$) regions which are substantially homogenous with respect to one or more attributes of the image, generates a graph based on $M_1$ ($M_1 \geq 1$) of the $N_1$ regions, and stores data for the graph in database 16. Database 16 may then be used to retrieve an image that is similar to an input query image. To this end, application 19 divides the query image into $N_2$ ($N_2 \geq 1$) regions which are substantially homogenous with respect to one or more attributes of the query image, generates a graph based on $M_2$ ($M_2 \geq 1$) of the $N_2$ regions, and compares the generated graph to other graphs in the database, wherein one or more individual values for $N_1$, $N_2$, $M_1$ and $M_2$ may, or may not, be equal. Finally, the system retrieves one or more images, e.g., from data 14 in memory 12, having graphs that are similar to the generated graph.

Figure 3:
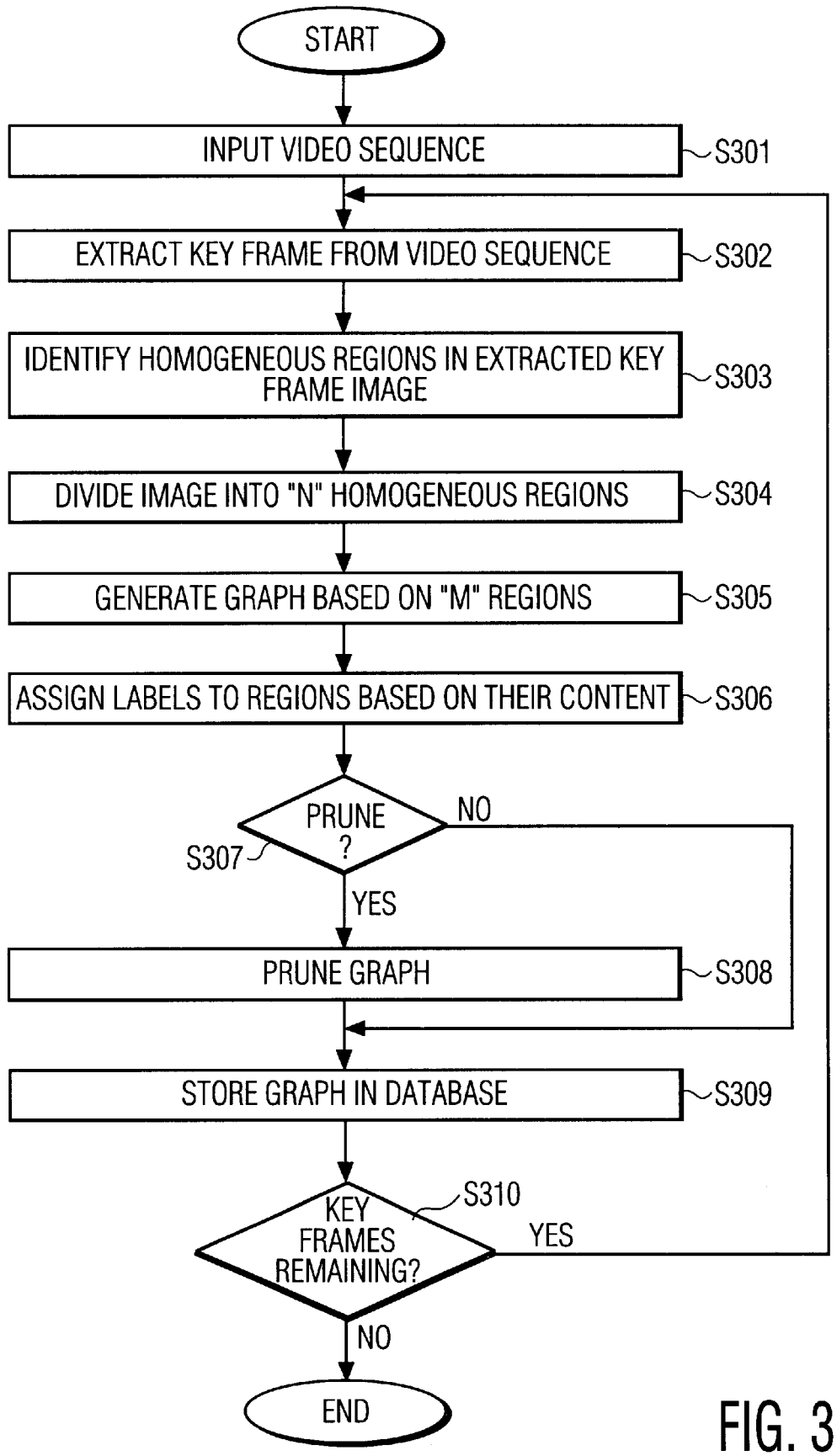
FIG. 3 is a flow diagram showing process steps for building a database in accordance with the present invention.

In more detail, FIG. 3 shows process steps for implementing the database building aspect of the present invention. To begin, step S301 inputs video data from a video source, such as a digital video camera, or the like. Alternatively, step S301 may download the video from a remote location, such as the Internet, a local area network ("LAN"), or a wide area network ("WAN"). As is well known, video data is comprised of a plurality of frames. It also may be coded according to any one of a variety of well-known video coding standards, such as MPEG-1, MPEG-2, MPEG-4, DVB, etc.

Next step S302 extracts key frames from the input video sequence. In this regard, each video sequence includes key frames, meaning frames that include all data necessary for display thereof. For example, in the case of MPEG-coded video, where frames are either intraframes, predictive frames, or bi-directional frames, the key frames are typically intraframes because they contain all data necessary for decoding. In contrast, MPEG predictive and bi-directional frames reference data in other frames using, e.g., motion vectors, which data is then used to decode those frames. Once a key frame has been extracted, it is decoded, if necessary, and an image formed therefrom.

Step S303 identifies one or more homogeneous regions in this image. What is meant by a homogeneous region here is a region that contains one or more common attributes, such as color, texture, tone, lightness, etc. Of course, this list is merely representative of attributes that may define a homogeneous image region. In fact, any image attribute can be used to define a homogeneous image region. Moreover, homogeneous, in this context, need not necessarily mean identical. For example, if an image contains various shades of green, step S303 may combine several shades of green into a single "homogeneous" region if those shades are all below a predetermined "green" threshold. Similarly, the homogeneous regions may be defined by more than one attribute or by a predominance of one attribute. For example, a homogeneous region may be defined by a specific color and texture.

Figure 4:
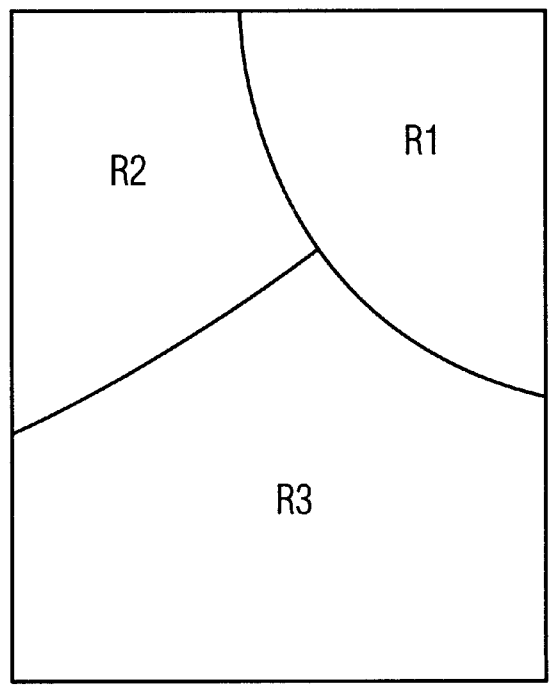
FIG. 4 shows regions of an image which has been segmented in accordance with the present invention.
Figure 5:
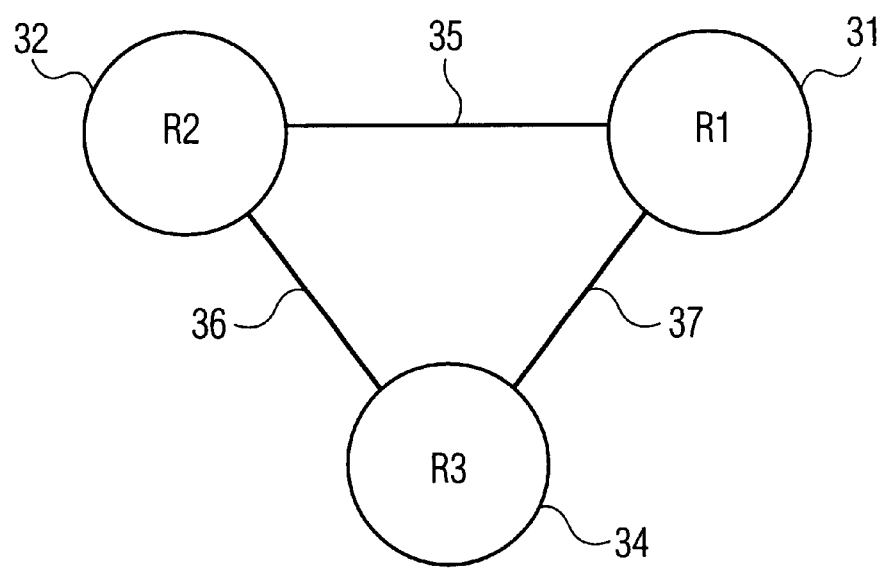
FIG. 5 shows a graph corresponding to the regions of FIG. 4.

In any case, once N ($N \geq 1$) homogeneous image regions have been identified, step S304 divides the image into the N homogeneous regions. By way of example, step S304 may divide an image, such as the subject key frame of video, into homogeneous regions R1, R2 and R2 shown in FIG. 4. Thereafter, step S305 generates a connected, undirected graph based on M of the N regions, where $1 \leq M \leq N$. FIG. 5 shows an example of such a graph generated for the image regions R1, R2 and R3 of FIG. 4. As shown, the graph of comprised of vertices 31, 32 and 33, each of which corresponds to a region R1, R2 and R3, together with edges 35, 36 and 37 that connect the regions. In this regard, the graph is "connected" since there is a path connecting each of the vertices on the graph, and it is "undirected" since each path between a first vertex "A" and a second vertex "B" is identical in the "A-to-B" and the "B-to-A" directions.

Step S306 then assigns labels to the vertices (i.e., the regions) of the graphs based on the regions' contents. While many different types of labeling systems may be used, the preferred embodiment of the present invention labels the regions using attribute clustering in the Y-H (luminance-hue) color space. More specifically, in the preferred embodiment, there are 100 labels, ranging from 00 to 99, with the number in the "tens" position corresponding to the hue label and the number in the "ones" position corresponding to the luminance label. These labels cover hue values in the range of 100 to 350 and luminance values in the range of 100 to 250. A quantization level of 25 is set in both the Y and H dimensions.

More specifically, in the preferred embodiment of the invention, the labels for hue ("LabelH") and for luminance ("LabelY") are determined as follows:

$$\begin{aligned}
LabelH &= 0 & H &\leq 100 \\
&= INT[(H-100)/25] & 100 &< H < 350 \\
&= 9 & H &\geq 350 \\
LabelY &= 0 & Y &\leq 100 \\
&= INT[(Y-100)/25] & 100 &< Y < 250 \\
&= 9 & Y &\geq 250,
\end{aligned} \quad (1)$$

where INT[ ] refers to taking only the integer portion of the quotient, so that LabelH and LabelY have integer values only. Edges may also be labeled to differentiate them from the vertices. In preferred embodiments of the invention, edges are labeled with values of 100.

By virtue of the foregoing labeling system, it is possible to perform "subgraph" matching. For example, if application 19 is looking for an image that includes a red car, only graphs having regions with Y-H labels that correspond to the color red need be searched. This process is described in greater detail below with respect to FIG. 6.

Following step S306, processing proceeds to step S307. Step S307 determines whether to "prune" the graph generated in steps S305 and S306. Pruning comprises removing vertices, labels and/or edges on the generated graph, and may be performed in order to reduce the size/complexity of the graph. To this end, pruning may be performed manually or automatically (i.e., without user intervention) based on predetermined criteria. In this regard, during pruning, it is preferable to preserve vertices that represent significant regions (i.e., regions of interest) on the graph. These regions are determined based on their attributes, such as perimeter, area, color, hue, saturation, luminance, LUV values, etc. In one preferred embodiment, pruning is performed by preserving the K ($K \geq 1$) largest regions of an image, and deleting remaining smaller regions which do not affect the graph's connectivity (since to alter the graph's connectivity could adversely affect the regions themselves). Pruning may also be performed so as to preserve all regions having a particular color, for example. Of course, there are many different ways to prune a graph in addition to those set forth herein.

Thus, if step S307 determines that pruning is to be performed, step S308 performs the appropriate pruning method on the graph, whereafter processing proceeds to step S309. On the other hand, if step S307 determines that pruning is not to be performed, processing proceeds directly to step S309. Step S309 stores the graph in database 16. Stored along with the graph is a pointer to the corresponding image. Alternatively, the image itself may be stored in the database. Database 16 may be stored at any location accessible to application 19, such as in memory 12 (as in the present example), a remote network server, or a computer-readable medium such as a floppy disk.

Following step S309, processing proceeds to step S310. Step S310 determines if there are any remaining key frames in the input video sequence to be processed. If there are such key frames remaining, processing returns to step S302, whereafter steps S303 to S309 are repeated therefor. If no such key frames remain in the input video sequence, processing ends.

Figure 6:
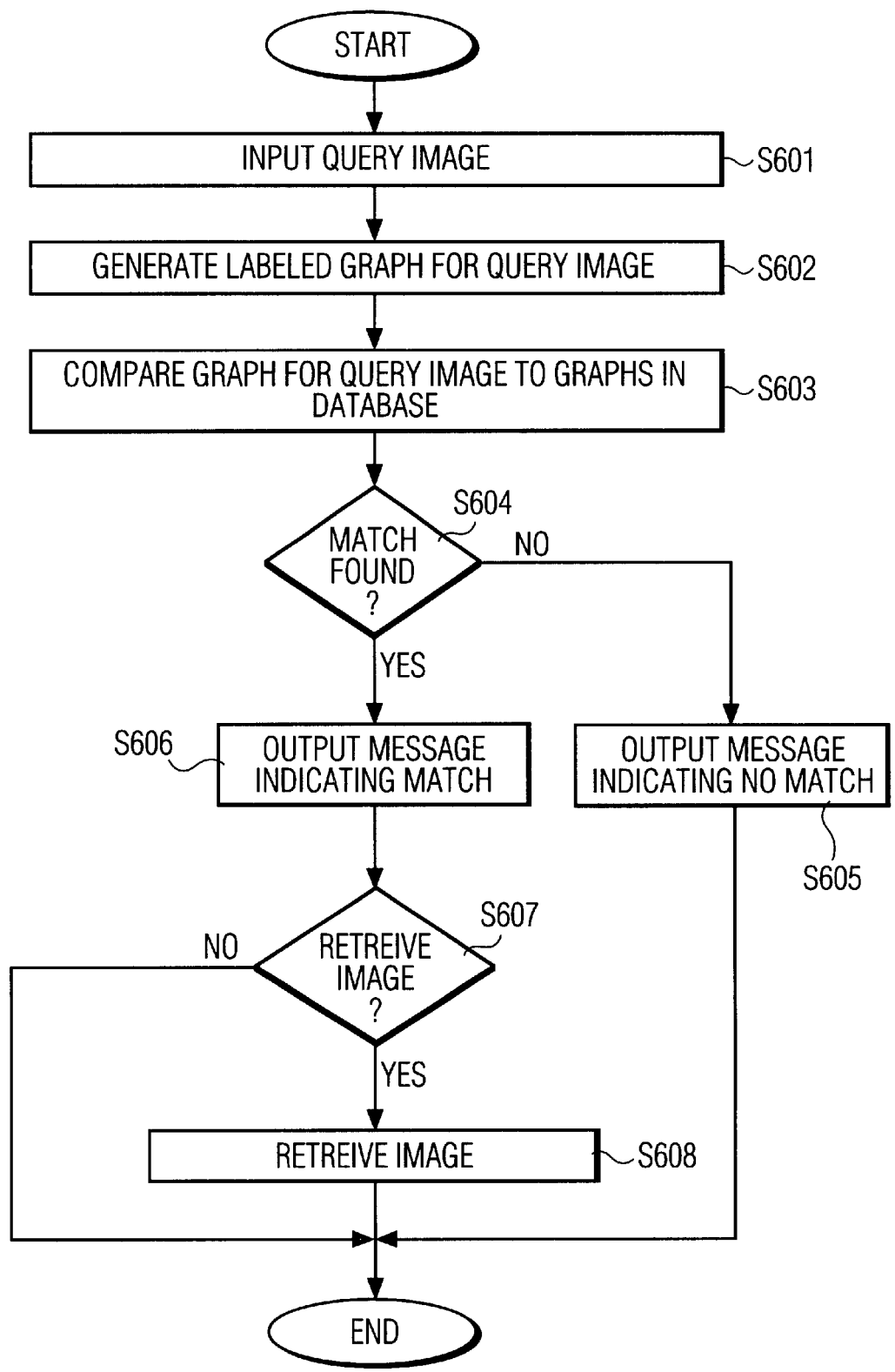
FIG. 6 is a flow diagram showing process steps for retrieving an image in accordance with the present invention.

FIG. 6 shows process steps for determining whether a query image is similar to an image whose graph is stored in database 16, and for retrieving such similar images. To begin, step S601 inputs the query image. This query image may be an individual image that has been input via, e.g., a scanner, downloaded from a remote network source, or the like. Similarly, the input image may be a key frame of a video sequence, in which case step S601 is identical to steps S301 and S302 of FIG. 3. In any case, once the query image has been input, processing proceeds to step S602.

Step S602 generates a labeled graph for the input query image. The processing performed in step S602 is identical to that of steps S303, S304, S305 and S306 of FIG. 3. Accordingly, a detailed description thereof is omitted here for the sake of brevity. Next, step S603 compares the graph generated for the query image to graphs in the database. In its simplest form, this comparison comprises comparing attributes of each region of the query image graph to those of the graphs in the database, and concluding that a match has been found (i) if the number of similarities between the query image graph and a graph in the database is above a predetermined threshold, or (ii) for a fixed number of graphs that are most similar to the query image graph (e.g., the ten most similar graphs). Preferred embodiments of the invention, however, utilize attributed subgraph matching which focuses in on, and weights, particular image region attributes, such as color, textures, etc. during the comparison.

More specifically, in the preferred embodiment of the invention, a region matching process is performed in order to preliminarily identify graph regions having attributes of interest, such as color, texture, etc. In this regard, the region matching process determines whether $$|LabelH_D - LabelH_Q| < T_1,$$

and $$|LabelY_D - LabelY_Q| < T_2, \quad (2)$$

where $LabelH_D$ and $LabelY_D$ are labels for a region of a graph in the database, $LabelH_Q$ and $LabelY_Q$ are labels for a region of the graph of the query image, and $T_1$ and $T_2$ are predetermined thresholds which are set based on the extent of similarity desired between the query image graph and those in the database; i.e., the smaller the values of $T_1$ and $T_2$, the more similar the graphs, and vice versa.

In a case that "$|LabelH_D-LabelH_Q|<T_1$" and "$|LabelY_D-LabelY_Q|<T_2$" for a particular region, the preferred embodiment of the invention performs region matching for that region. Otherwise, region matching is not performed. In this regard, the preferred region matching process of the present invention is as follows $$Cost = \sum_{i=1}^{N} W_i \cdot |f_i^D - f_i^Q|, \qquad (3)$$

where "Cost" comprises the amount of similarity between attributes f in the query (or "Q") graph and those in the database (or "D") graph, "W" comprises a predetermined weighting factor which may be set to give greater weight to certain attributes i such as color, and "N" comprises the number of attributes. In this regard, any number of attributes may be used. Examples of attributes include color (e.g., RGB, CMYK, etc.) values, hue, saturation, luminance, LUV values, region relative size (i.e., region size/image size), region compactness, and connection ratio of edges, among other things. As is clear from the foregoing cost equation, a cost of zero indicates that the two images are identical, whereas higher cost values indicate less similarity between images.

By performing subgraph matching in the foregoing manner, the invention is able to determine whether two images are similar substantially without regard to image orientation, rotation, scaling, translation, and aspect ratio variations. As was the case above, the query image graph also may be pruned so as to reduce the number of vertices, edges and/or labels. As noted, by pruning a graph, it is possible to reduce that graph's complexity, and thereby reduce the amount of information that must be compared between the query image graph and the database image graphs.

In addition to pruning, error tolerant processes may be employed in step S603 to account for noise, errors in image division/segmentation, missing or extra image regions, and the like in a graph. The preferred embodiment of the present invention employs five types of error tolerant processes, some of which are similar to pruning. These five processes comprise edge deletion, edge insertion, vertex deletion, vertex insertion, and label substitution. By way of example, error tolerant processes may be employed to "correct" disconnections in an image graph by inserting or deleting an edge, vertex, and/or label thereof. Of course, these changes to the graph may affect its accuracy, and thus incur a cost which will be added to the ultimate cost calculated in equation (3) above. In this regard, the cost for inserting or deleting a single edge is determined by $$Cost_{edge} = \sum_{i=1}^{N} W_i \cdot f_i, \qquad (4)$$

where "W" comprises a predetermined weighting factor which may be set to give greater weight to certain attributes f, such as connectivity, and "N" comprises the number of attributes. The cost for inserting or deleting a single vertex is determined by $$Cost_{vertex} = \sum_{i=1}^{N} W_i \cdot f_i, \qquad (5)$$

where "W" comprises a predetermined weighting factor which may be set to give greater weight to certain attributes f, such as color, and "N" comprises the number of attributes. Thus, once the error tolerant processes have been implemented $Cost_{edge}$ and/or $Cost_{vertex}$ may be added to the total cost calculated by equation (3) above, depending upon which processes have been effected.

Returning to FIG. 6, step S604 next determines whether a match was found in the comparison of step S603. This step is performed by comparing the cost determined in equation (3) above to a predetermined threshold. This threshold may be set experimentally based on the degree of similarity desired between the query image graph (and thus the query image) and the graphs in the database (and thus their corresponding images). If the cost is above this predetermined threshold, processing proceeds to step S605, which outputs a message indicating that there is no image that matches the query image. On the other hand, if the cost is below the predetermined threshold, processing proceeds to step S606, which outputs a message indicating a match.

Alternatively, step S604 selects a fixed number (e.g., ten) graphs that are most similar to the query image graph. Under this method, matches generally will always be found. In this case, therefore, step S606 may also output an indication as to which of the graphs in the database are most similar to the query image graph.

In a case, following step S606, one or more images corresponding to the query image (i.e., images whose graphs substantially match the graph of the query image) may be retrieved. If such an image is to be retrieved, processing proceeds through step S607 to step S608, where pointers to those corresponding images stored in graph database 16 are retrieved and used to locate the images. The images are then retrieved in step S608, and may be displayed and/or processed as desired. Thereafter, processing ends for the current query image.

Figure 7:
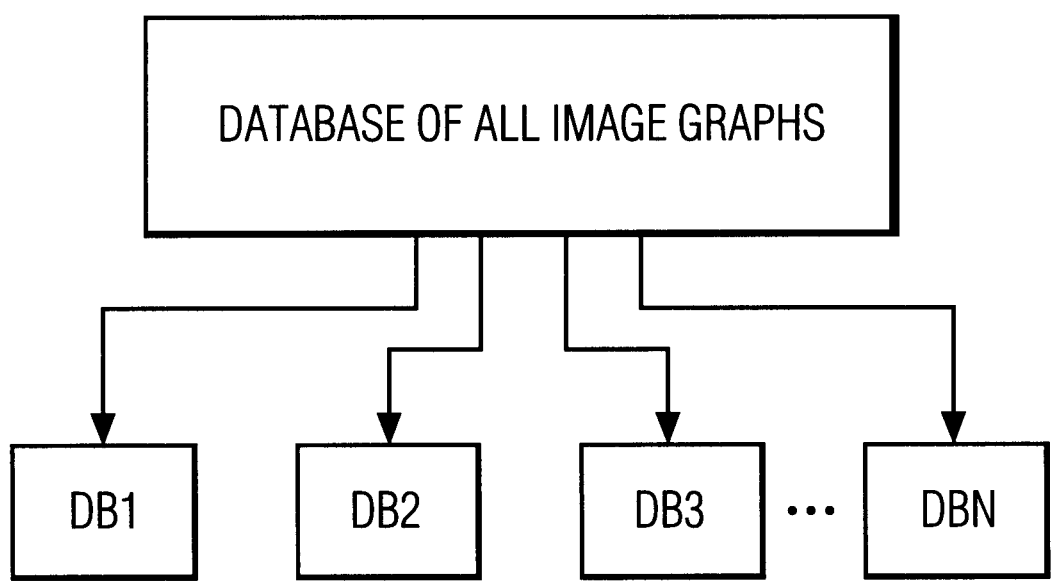
FIG. 7 shows a hierarchical database produced by the present invention.

The processing shown in FIG. 6 may also be used in connection with the database building process of FIG. 3. More specifically, the database of the present invention may be organized hierarchically, as shown in FIG. 7. According to this structure, the image graphs in database 16 are grouped into sub-databases $DB_1$, $DB_3$, $DB_3$ ... $DB_N$ based on image similarity. The processing shown in FIG. 6 may be used to determine which image graphs are similar and thus which image graphs should be included within which sub-databases. Of course, this process may be performed manually as well. That is, the images themselves may be compared visually, and then their corresponding graphs stored into the appropriate sub-databases.

In any case, the sub-databases can be used to streamline the graph comparison process even further. That is, each sub-database may be labeled according to the Y-H labeling system described above. When Y-H labels are determined for regions of an image, the appropriate database may then be identified and searched, rather than searching through a database of all images. This cuts down on searching time and thus provides a more efficient process overall.

As noted above, although the invention is described in the context of a personal computer, the invention can be used with any apparatus that processes digital images. For example, the invention can be used in a digital television system (i.e., the television itself or a settop box), such as that described in U.S. patent application Ser. No. 09/062,940, entitled "Digital Television System which Switches Channels In Response To Control Data In a Television Signal", the contents of which are hereby incorporated by reference into the subject application as if set forth herein in full. That is, the invention could be executed by the television's processor to locate a stored video clip based on a downloaded frame.

Similarly, the invention is not limited to use with video. For example, it could be used in a computer-controlled photocopier for pattern detection. In this regard, one problem with conventional photocopiers, and color copiers in particular, relates to copying currency, banknotes, and securities. Since it is illegal to copy such documents, copiers typically store these "prohibited" images in a memory, compare each scanned image to these prohibited images, and, when a prohibited image is detected (i.e., when the scanned image is substantially identical to an image stored in memory), prevent copying. The processing of the present invention thus can be used to determine whether a scanned image corresponds to one of these prohibited images.

Finally it is noted that the process steps shown in FIGS. 3 and 6 need not necessarily be executed in the exact order shown, and that the order shown is merely one way for the invention to operate. Thus, other orders of execution are permissible, so long as the functionality of the invention is substantially maintained.

In this regard, the present invention has been described with respect to a particular illustrative embodiment. It is to be understood that the invention is not limited to the above-described embodiment and modifications thereto, and that various changes and modifications may be made by those of ordinary skill in the art without departing from the spirit and scope of the appended claims.

What is claimed is:

1. A method of building a database of image-related data, the method comprising the steps of:
    inputting a plurality of images; and
    for each image:
        dividing the image into N (N≧1) regions which are substantially homogenous with respect to at least one attribute of the image;
        generating a graph based on M (M≧1) of the regions; and
        storing data for the graph in the database by forming groups of images primarily based on graphs of the images and storing the groups of images into sub-databases, wherein the forming step forms the groups based on images having graphs with at least a predetermined number of similarities.

2. A method according to claim 1, wherein the inputting step comprises the steps of:
    inputting frames of video data; and
    extracting key frames from the video data;
    wherein the dividing, generating and storing steps are performed for each extracted key frame of video.

3. A method according to claim 1, wherein the at least one attribute comprises textures and/or colors in the image.

4. A method according to claim 1, further comprising, between the generating and storing steps, the step of assigning labels to regions of the graph based on contents of the regions.

5. A method according to claim 4, wherein the assigning step assigns at least one region in the graph a label based on its position in a color space.

6. A method accordingly to claim 1, wherein the step of dividing the image into N (N≧1) regions comprises dividing the image into N (N≧1) regions which are substantially homogenous with respect to at least two attributes of the image.

7. A method of using graphs corresponding to a plurality of images as a primary type of interest to determine whether a query image is similar to one or more of the plurality of images, the method comprising the steps of:
    inputting the query image;
    dividing the query image into N (N≧1) regions which are substantially homogenous with respect to at least one attribute of the query image;
    generating a graph based on M (M≧1) of the regions; and
    comparing the generated graph to other graphs that correspond to the plurality of images.

8. A method according to claim 7, further comprising the step of retrieving an image from memory that has a graph that is substantially similar to the generated graph.

9. A method according to claim 7, wherein the inputting step comprises the steps of:
    inputting frames of video; and
    extracting a key frame from the video, the query image corresponding to at least part of the key frame.

10. A method according to claim 7, further comprising, between the generating and comparing steps, the step of assigning labels to regions of the generated graph based on contents of the regions;
    wherein the comparing step determines which, if any, regions of the generated graph to compare to the other graphs based on the labels assigned to the generated graph and labels included on the other graphs.

11. A method according to claim 7, further comprising the step of pruning the generated graph prior to comparing it to the other graphs;
    wherein pruning comprises removing at least one of vertices, labels and edges from the generated graph.

12. A method according to claim 11, wherein the pruning step removes vertices, labels and/or edges from the generated graph that correspond to homogeneous image regions having a predetermined attribute.

13. Computer-executable process steps stored on a computer-readable medium, the computer-executable process steps to build a database of image-related data, the computer-executable process steps comprising:
    code to input a plurality of images; and
    code, for each image, (i) to divide the image into N (N≧1) regions which are substantially homogenous with respect to at least one attribute of the image, (ii) to generate a graph based on M (M≧1) of the regions, and (iii) to store data for the graph in the database by forming groups of images primarily based on graphs of the images and storing the groups of images into sub-databases, wherein the code for forming the groups of images forms the groups based on images having graphs with at least a predetermined number of similarities.

14. Computer-executable process steps according to claim 13, wherein the inputting code comprises:
    code to input frames of video data; and
    code to extract key frames from the video data;
    wherein the dividing, generating and storing code is executed for each extracted key frame of video.

15. Computer-executable process steps according to claim 13, wherein the at least one attribute comprises textures and/or colors in the image.

16. Computer-executable process steps according to claim 13, further comprising code to assign labels to regions of the graph based on contents of the regions.

17. Computer-executable process steps according to claim 16, wherein the assigning code assigns at least one region in the graph a label based on its position in a color space.

18. Computer-executable process steps according to claim 13, wherein the storing code comprises:

code to form groups of images based on graphs of the images; and code to store the groups of images into sub-databases.

19. Computer-executable process steps according to claim 17, wherein the forming code forms the groups based on images having graphs with at least a predetermined number of similarities.

20. Computer-executable process steps stored on a computer-readable medium, the computer executable process steps using graphs corresponding to a plurality of images to determine whether a query image is similar to one or more of the plurality of images, the computer-executable process steps comprising:

code to input the query image;

code to divide the query image into N (N≧1) regions which are substantially homogenous with respect to at least one attribute of the query image;

code to generate a graph based on M (M≧1) of the regions; and code to primarily compare the generated graph to other graphs that correspond to the plurality of images.

21. Computer-executable process steps according to claim 20, further comprising code to retrieve an image from memory that has a graph that is substantially similar to the generated graph.

22. Computer-executable process steps according to claim 20, wherein the inputting code comprises:

code to input frames of video; and code to extract a key frame from the video, the query image corresponding to at least part of the key frame.

23. Computer-executable process steps according to claim 20, further comprising code to assign labels to regions of the generated graph based on contents of the regions;

wherein the comparing code determines which, if any, regions of the generated graph to compare to the other graphs based on the labels assigned to the generated graph and labels included on the other graphs.

24. Computer-executable process steps according to claim 20, further comprising code to prune the generated graph prior to comparing it to the other graphs;

wherein pruning comprises removing at least one of vertices, labels and edges from the generated graph.

25. Computer-executable process steps according to claim 24, wherein the pruning code removes vertices, labels and/or edges from the generated graph that correspond to homogeneous image regions having a predetermined attribute.

26. An apparatus for building a database of image-related data, the apparatus comprising:

a memory which stores computer-executable process steps; and a processor which executes the process steps so as to input a plurality of images, and for each image: (i) to divide the image into N (N≧1) regions which are substantially homogenous with respect to at least one attribute of the image, (ii) to generate a graph based on M (M≧1) of the regions, and (iii) to store data for the graph in the database by forming groups of images primarily based on graphs of the images and storing the groups of images into sub-databases, wherein the forming groups of images forms the groups based on images having graphs with at least a predetermined number of similarities.

27. An apparatus according to claim 26, wherein the processor inputs the plurality of images by (i) inputting frames of video data, and (ii) extracting key frames from the video data, wherein the dividing, generating and storing steps are performed for each extracted key frame of video.

28. An apparatus according to claim 26, wherein the at least one attribute comprises textures and/or colors in the image.

29. An apparatus according to claim 26, wherein the processor, between the generating and storing steps, executes process steps to assign labels to regions of the graph based on contents of the regions.

30. An apparatus according to claim 29, wherein the assigning step assigns at least one region in the graph a label based on its position in a color space.

31. An apparatus according to claim 26, wherein the processor stores the data by (i) forming groups of images based on graphs of the images, and (ii) storing the groups of images into sub-databases.

32. An apparatus according to claim 31, wherein the forming step forms the groups based on images having graphs with at least a predetermined number of similarities.

33. An apparatus for using graphs corresponding to a plurality of images as a primary type of interest to determine whether a query image is similar to one or more of the plurality of images, the apparatus comprising:

a memory which stores computer-executable process steps; and a processor which executes the process steps so as (i) to input the query image, (ii) to divide the query image into N (N≧1) regions which are substantially homogenous with respect to at least one attribute of the query image, (iii) to generate a graph based on M (M≧1) of the regions, and (iv) to compare the generated graph to other graphs that correspond to the plurality of images.

34. An apparatus according to claim 33, wherein the processor further executes process steps to retrieve an image from memory that has a graph that is substantially similar to the generated graph.

35. An apparatus according to claim 33, wherein the processor inputs the query image by (i) inputting frames of videos and (ii) extracting a key frame from the video, the query image corresponding to at least part of the key frame.

36. An apparatus according to claim 33, wherein the processor executes, between the generating and comparing steps, process steps to assign labels to regions of the generated graph based on contents of the regions;

wherein the comparing step determines which, if any, regions of the generated graph to compare to the other graphs based on the labels assigned to the generated graph and labels included on the other graphs.

37. An apparatus according to claim 33, wherein the processor executes process steps so as to prune the generated graph prior to comparing it to the other graphs;

wherein pruning comprises removing at least one of vertices, labels and edges from the generated graph.

38. An apparatus according to claim 37, wherein the pruning step removes vertices, labels and/or edges from the generated graph that correspond to homogeneous image regions having a predetermined attribute.

* * * * *